(12) United States Patent
Vieillard

(10) Patent No.: US 9,745,943 B2
(45) Date of Patent: Aug. 29, 2017

(54) CONTROL AND POWER SUPPLY SYSTEM FOR HELICOPTER TURBINE ENGINES

(71) Applicant: LABINAL POWER SYSTEMS, Blagnac (FR)

(72) Inventor: Sebastien Vieillard, La Chapelle Gauthier (FR)

(73) Assignee: LABINAL POWER SYSTEMS, Blagnac (FR)

( * ) Notice: Subject to any disclaimer, the term of this patent is extended or adjusted under 35 U.S.C. 154(b) by 353 days.

(21) Appl. No.: 14/400,449

(22) PCT Filed: May 6, 2013

(86) PCT No.: PCT/FR2013/051007
§ 371 (c)(1),
(2) Date: Nov. 11, 2014

(87) PCT Pub. No.: WO2013/167837
PCT Pub. Date: Nov. 14, 2013

(65) Prior Publication Data
US 2015/0130186 A1 May 14, 2015

(30) Foreign Application Priority Data
May 11, 2012 (FR) ...................................... 12 54333

(51) Int. Cl.
*F02N 11/04* (2006.01)
*F02N 11/08* (2006.01)
(Continued)

(52) U.S. Cl.
CPC .......... *F02N 11/0862* (2013.01); *B64D 27/24* (2013.01); *B64D 31/00* (2013.01);
(Continued)

(58) Field of Classification Search
None
See application file for complete search history.

(56) References Cited

U.S. PATENT DOCUMENTS

2004/0108726 A1* 6/2004 Sarlioglu ............ F02N 11/0859
290/38 R
2010/0193630 A1 8/2010 Duces et al.
(Continued)

FOREIGN PATENT DOCUMENTS

FR 2 967 847 A1 5/2012
WO 2009/125007 A2 10/2009

OTHER PUBLICATIONS

International Search Report issued Jan. 16, 2014, in PCT/FR2013/051007, filed May 6, 2013.

*Primary Examiner* — Jared Fureman
*Assistant Examiner* — Aqeel Bukhari
(74) *Attorney, Agent, or Firm* — Oblon, McClelland, Maier & Neustadt, L.L.P.

(57) ABSTRACT

An electrical control and power supply system for at least one helicopter motor/generator, the system including a first DC/AC converter selectively delivering AC electrical power to the at least one motor/generator, depending on respective positions of contactors of a connection matrix actuated from an electronic control circuit, the first DC/AC converter powered with DC by a DC power supply device that includes either a circuit for rectifying an AC voltage delivered via a contactor by a starter/generator of an APU, or a voltage booster DC/DC converter powered from a battery via a contactor. The connection matrix further includes a contactor connecting the first DC/AC converter in parallel with the second DC/AC converter to make it possible, once at least one of the motors/generators has started, to inject additional power from the starter/generator of the APU.

5 Claims, 1 Drawing Sheet

(51) Int. Cl.
*H02J 3/38* (2006.01)
*H02J 5/00* (2016.01)
*B64D 27/24* (2006.01)
*B64D 31/00* (2006.01)
*B64D 27/02* (2006.01)

(52) U.S. Cl.
CPC .......... *F02N 11/04* (2013.01); *F02N 11/0848* (2013.01); *H02J 3/38* (2013.01); *H02J 5/00* (2013.01); *B64D 2027/026* (2013.01); *B64D 2221/00* (2013.01); *Y02T 50/44* (2013.01); *Y02T 50/64* (2013.01)

(56) References Cited

U.S. PATENT DOCUMENTS

| | | |
|---|---|---|
| 2011/0273011 A1 | 11/2011 | De Wergifosse |
| 2013/0229053 A1 | 9/2013 | Rambaud et al. |
| 2014/0197681 A1* | 7/2014 | Iwashima ............... B60R 16/03 307/9.1 |

* cited by examiner

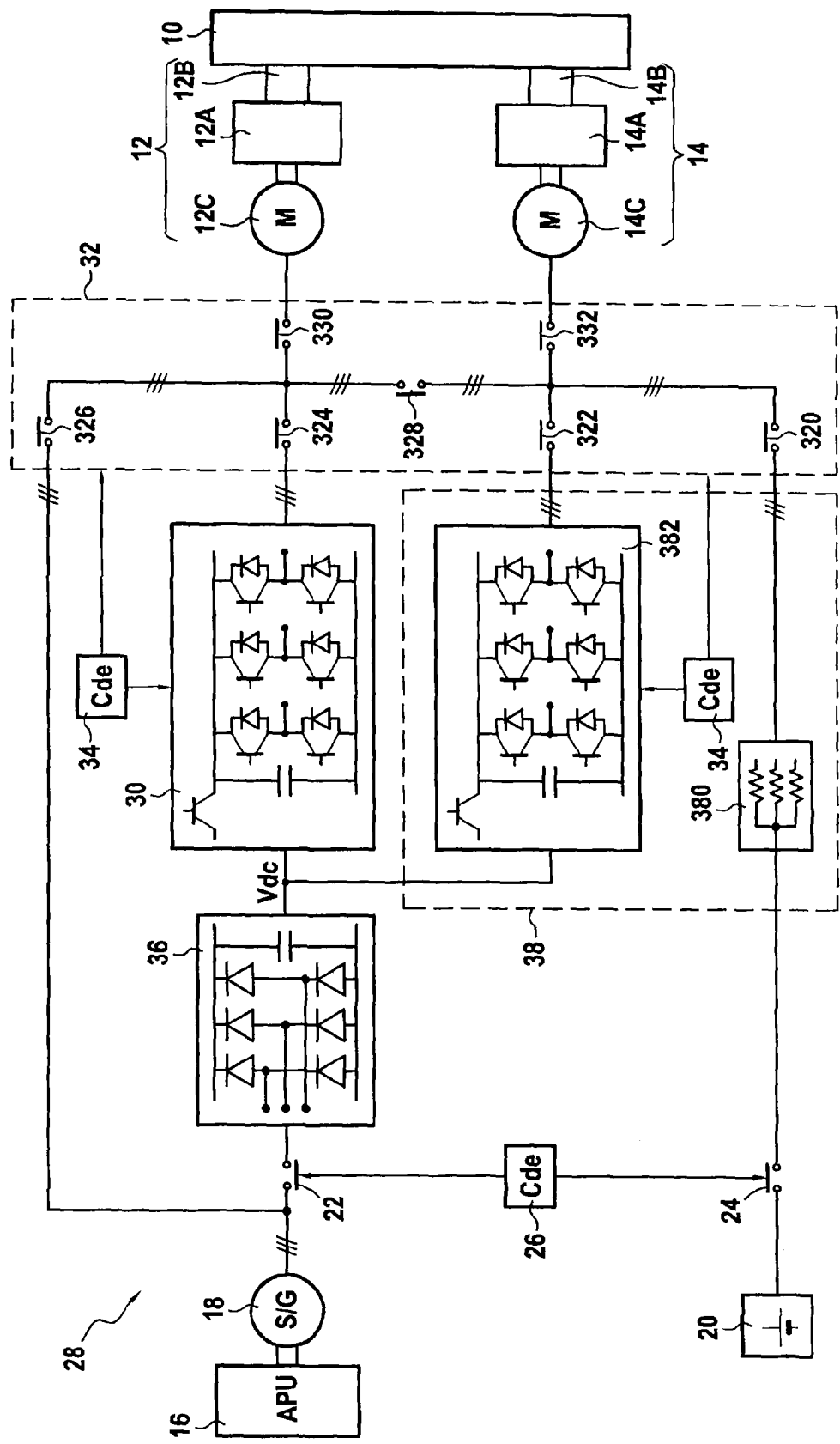

CONTROL AND POWER SUPPLY SYSTEM FOR HELICOPTER TURBINE ENGINES

BACKGROUND OF THE INVENTION

The invention relates to the field of electrical hybridization of the propulsion of helicopters and other rotorcraft having at least one bladed main rotor, and the invention relates more particularly to a control and power supply system for at least one electric motor coupled to the turbine engine or to the main gearbox (MGB) of the rotorcraft.

In such a rotorcraft, the MGB connects an outlet shaft from the turbine engine to the bladed main rotor via a speed reducer. In addition, an auxiliary power unit (APU) serves in particular to deliver electrical power on board when the engines of the rotorcraft are stopped, in particular on the ground before they are set into rotation.

The APU is in the form of a turbine engine driving an electricity generator. This generator is designed as a starter/generator (S/G) that operates in motor mode in order to start the APU and in generator mode after the turbine engine has started and once it has reached a sufficient speed of rotation. When operating in motor mode, the S/G is powered with multiphase electricity. For this purpose, it is well known to use a direct current/alternating current (DC/AC) converter device with inverters serving to transform a DC voltage as delivered by a battery via a voltage booster DC/DC converter into AC voltages.

A major trend at present is to replace hydraulic or pneumatic power with electrical power for operating various systems in an airplane. In addition to simplifying maintenance, advantages are often sought in terms of decreasing weight and size and of reducing costs.

OBJECT AND SUMMARY OF THE INVENTION

The present invention follows this trend and for this purpose it proposes an electrical control and power supply system for at least one helicopter motor/generator, the system comprising a first DC/AC converter for selectively delivering AC electrical power to said at least one motor/generator, depending on the respective positions of contactors of a connection matrix actuated from an electronic control circuit, the first DC/AC converter being powered with DC by a DC power supply device that is formed either by a circuit for rectifying an AC voltage delivered via a contactor by a starter/generator of an APU, or else by a voltage booster DC/DC converter powered from a battery via a contactor, said connection matrix further including a contactor for connecting said first DC/AC converter in parallel with said second DC/AC converter so as to make it possible, once at least one of said motors/generators has started, to inject additional power from said starter/generator of the APU.

Making a common electricity resource available between two systems, namely the starter/generator of the APU and the motors/generators of the MGB or of the turbine engines, which do not operate at the same time and which require substantially the same level of electrical power, is particularly advantageous in that, without overdimensioning the common power supply device, it leads to a reduction in the number of units, harnesses, and interfaces, and thus to decreasing weight, size, and costs.

Advantageously, said voltage booster DC/DC converter is obtained by connecting in series a three-phase inductor and a second DC/AC converter via at least one contactor.

Such an arrangement in which the DC/AC converter also transforms into alternating current a direct current delivered from a battery via a three-phase inductor makes it possible to start the APU.

Preferably, said connection matrix includes at least one contactor for connecting said first DC/AC converter to a first motor/generator and at least one contactor for connecting said second DC/AC converter to a second motor/generator.

BRIEF DESCRIPTION OF THE DRAWING

The invention can be better understood on reading the following description given by way of non-limiting indication and with reference to the sole FIGURE, which is a simplified circuit diagram of an electrical control and power supply system of the invention.

DETAILED DESCRIPTION OF EMBODIMENTS OF THE INVENTION

A helicopter, and more generally a rotorcraft, has at least one bladed main rotor that is rotated to provide lift and propulsion. The main rotor is driven by one or more turbine engines via a transmission and speed reduction mechanism, commonly referred to as a main gearbox (MGB).

FIG. 1 shows an MGB 10 engaged respectively with two turbine engines 12 and 14 each having a gas generator 12A, 14A, a free turbine 12B, 14B driven by the stream of gas generated by the gas generator, and a reversible electrical machine 12C, 14C constituted by an electric motor capable of operating as an electricity generator and mechanically coupled to the gas generator. In the FIGURE, reference 16 designates an auxiliary power unit (APU) that is mechanically coupled to an electrical machine 18 constituting a starter/generator (S/G), and reference 20 designates a battery. The starter/generator 18 typically delivers three-phase electricity at 115 volts AC (Vac) via a contactor 22, and the battery 20 typically delivered electricity at 28 volts DC (Vdc) via a contactor 24, both of those voltages being conventional in aviation, and the electricity is delivered under the control of a control unit 26.

In the invention, the electrical control and power supply system 28 for the helicopter motors/generators 12C, 14C comprises a first DC/AC converter 30 for selectively delivering alternating electrical power to the motors/generators, depending on the positions of contactors 320, 322, 324, 326, 328, 330 of a connection matrix 32 actuated by an electronic control circuit 34, this first DC/AC converter itself being powered with DC via a power supply device delivering a DC voltage and constituted either by a diode rectifier circuit 36 (non-controlled rectifier) for rectifying an AC voltage delivered by the starter/generator 18, or else by a voltage-booster DC/DC converter 38 powered from the battery 20.

The first DC/AC converter 30 is constituted by a three-phase converter (i.e. having six switches) that may optionally be preceded, as shown, by a protection device comprising a controlled switch followed by a parallel-connected capacitor. The switches forming the inverter are commonly insulated gate bipolar transistors (IGBTs) having anti-parallel diodes connected across their terminals and switched under the control of the electronic control circuit 34.

The non-controlled rectifier circuit 36 is advantageously constituted by a three-phase diode bridge delivering a rectified and filtered voltage at 270 Vdc across the terminals of the capacitor, which voltage is conventional in the field of aviation.

The voltage booster DC/DC converter 38 is constituted by a three-phase inductor 380 connected in series via the connection matrix 32 with a second DC/AC converter 382. Like the first converter, the second converter is constituted by a three-phase inverter having six switches optionally preceded, as shown, by a protection device comprising a controlled switch followed by a parallel-connected capacitor. The switches forming the inverter are commonly IGBTs having anti-parallel diodes connected across their terminals and having their switching controlled by the electronic control circuit 34.

The electronic control circuit 34 that controls the connection matrix 32 and the two DC/AC converters 30, 38 may be mounted in a single control unit, which then preferably incorporates the control unit 26, or else it may be arranged separately, as shown.

The operation of the system of the invention is explained below. It depends on the intended functions and the operational requirements of the helicopter, in particular starting the APU, controlling the turbine engines, or injecting additional power into the turbine engines depending on whether that is done via one and/or both electric motors for driving simultaneously. For example, mention may be made of the situation in which power is injected to the MGB via only one electric motor or only one turbine engine at a time (e.g. in order to boost one turbine engine in the event of losing the other), but with the ability to power either one of the turbine engines using the same power electronics. Mention may also be made to the situation in which two electric motors are both mounted on the same turbine engine gas generator, or indeed of two motors mounted on its free turbine or on the MGB.

In more detailed manner, the structure of the invention, which is based on a rectifier bridge, two inverters, and a set of contactors, serves to manage those various functions very simply, as set out below (the preferred embodiment is described with reference to controlling two motors for gas generators, but naturally it is applicable to controlling a single motor for the MGB, for example).

In order to start the APU from the low voltage (typically 28 Vdc) delivered by the battery 20, with the contactor 24 closed, the second DC/AC converter 38 is used as an active rectifier (three-phase voltage booster) in order to obtain a voltage of about 270 Vdc (the contactors 320 and 322 then being closed), the first DC/AC converter 30 driving the starter/generator 18 of the APU using this DC voltage via the contactors 324 and 326 that are then closed, while the contactor 22 and the contactors 328, 330, and 332 are open.

Once the APU has started, the turbine engines can be started in turn using the voltage of the 115 Vac network as delivered by the S/G 18. Once the contactor 22 is closed, this voltage is delivered to the non-controlled rectifier circuit 36, which in turn delivers the rectified and filtered DC voltage, with each of the two DC/AC converters 30, 382 acting, via respective pairs of contactors in series 324 & 330 and 322 & 332, to drive respective electric motors 12C and 14C enabling both turbine engines to be started simultaneously (if necessary), with the contactors 24, 320, 326, and 328 then being open.

It should be observed that the turbine engines may also be started from the low voltage from the battery 20 in similar manner to starting the APU. In practice, it is appropriate to start one of the two turbine engines, e.g. by closing the contactor 330 in order to power the electric motor 12C instead of closing the contactor 326 previously powering the S/G 18. Thereafter, once the first turbine engine has started, its electric motor can be used as a generator for delivering the power needed for starting the second turbine engine by then closing the contactors 322 and 332, the contactors 24 and 320 simultaneously being open. This also makes it possible to make do completely without an alternative power supply (via the APU or any other generator) for starting the turbine engines.

Once the turbine engines have started (and regardless of their preceding states), additional power can be injected into one of the turbine engines from the S/G 18 operating as a generator either in transient manner or else permanently. Thus, by closing the contactor 22, the S/G 18 powers the non-controlled rectifier circuit 36 to generate the DC voltage used in each DC/AC converter 30, 382 for acting via their respective contactors in series 324 & 330 and 322 & 332 to drive the electric motor 12C, 14C associated with each of the gas generators. In order to obtain a greater level of power injection into a turbine engine, it is possible either to use both DC/AC converters in parallel (e.g. the motor 12C, the contactors 22, 324, 330, 322, and 328 in the closed position, with the contactors 24, 320, 326, and 332 in the open position), or else to provide better availability of power injection by using one or the other in the event of one of them failing (the contactors 322 and 324 also serving to isolate completely one of the DC/AC converters under such circumstances, the contactor 328 enabling either one of them to take the place of the other).

It should be observed that using single-phase contactors (instead of the three-phase contactors shown) would also give rise to additional degraded modes, thus increasing the availability of the functions in question, should that be necessary.

With the invention, the way the electronic power members are shared makes it possible to provide a multifunction electrical control and power supply system, and in particular makes it possible with a single inverter to drive a plurality of electric motors/generators. The use of a common system for the unit for controlling starting of the APU and for the electric generators leads to a significant reduction in weight, size, and cost, compared with using respective dedicated power supply systems.

The control and power supply system may advantageously be arranged in the central portion of the helicopter, close to its primary electrical core, thus serving to optimize its overall electrical architecture.

The invention claimed is:

1. An electrical control and power supply system for at least one helicopter motor/generator, the system comprising:
  a first DC/AC converter selectively delivering AC electrical power to the at least one helicopter motor/generator, depending on respective positions of contactors of a connection matrix actuated from an electronic control circuit, the first DC/AC converter powered with DC by a DC power supply device that includes either a circuit rectifying an AC voltage delivered via a first contactor by a starter/generator of an auxiliary power unit (APU), or a voltage booster DC/DC converter powered from a battery via a second contactor and formed by connecting in series a three-phase inductor and a second DC/AC converter via at least one contactor of the connection matrix,
  wherein, for injecting additional power to the at least one helicopter motor/generator once started from said starter/generator of the APU, the connection matrix further a contactor for connecting the first DC/AC converter in parallel with the second DC/AC converter.

2. A system according to claim 1, wherein the connection matrix includes at least one contactor connecting the first DC/AC converter to a first helicopter motor/generator and at least one contactor connecting the second DC/AC converter to a second helicopter motor/generator.

3. A system according to claim 2, wherein the connection matrix further includes at least one contactor connecting the first DC/AC converter to the starter/generator to enable the APU to be started from the battery.

4. A system according to claim 1, wherein the connection matrix includes seven contactors, the first and second contactors of the connection matrix being provided between the three-phase inductor and the second DC/AC converter, the third and fourth contactors of the connection matrix being provided between the first DC/AC converter and the starter/generator of the APU, the fifth contactor of the connection matrix being the contactor for connecting the first DC/AC converter in parallel with the second DC/AC converter, the sixth contactor of the connection matrix being provided between the third contactor and a first helicopter motor/generator, and the seventh contactor of the connection matrix being provided between the second contactor and a second helicopter motor/generator.

5. A system according to claim 4, wherein the third contactor and the sixth contactor of the connection matrix connect the first DC/AC converter to the first helicopter motor/generator, and the second contactor and the seventh contactor of the connection matrix connect the second DC/AC converter to the second helicopter motor generator.

* * * * *